July 2, 1963

C. F. WALDRON 3,095,597

WINDSHIELD WIPER

Filed March 9, 1960

INVENTOR.
CLAUDE F. WALDRON
BY
Raymond A. Paquin
ATTORNEY.

July 2, 1963   C. F. WALDRON   3,095,597
WINDSHIELD WIPER
Filed March 9, 1960   5 Sheets-Sheet 2

INVENTOR.
CLAUDE F. WALDRON
BY
Raymond A. Paquin
ATTORNEY.

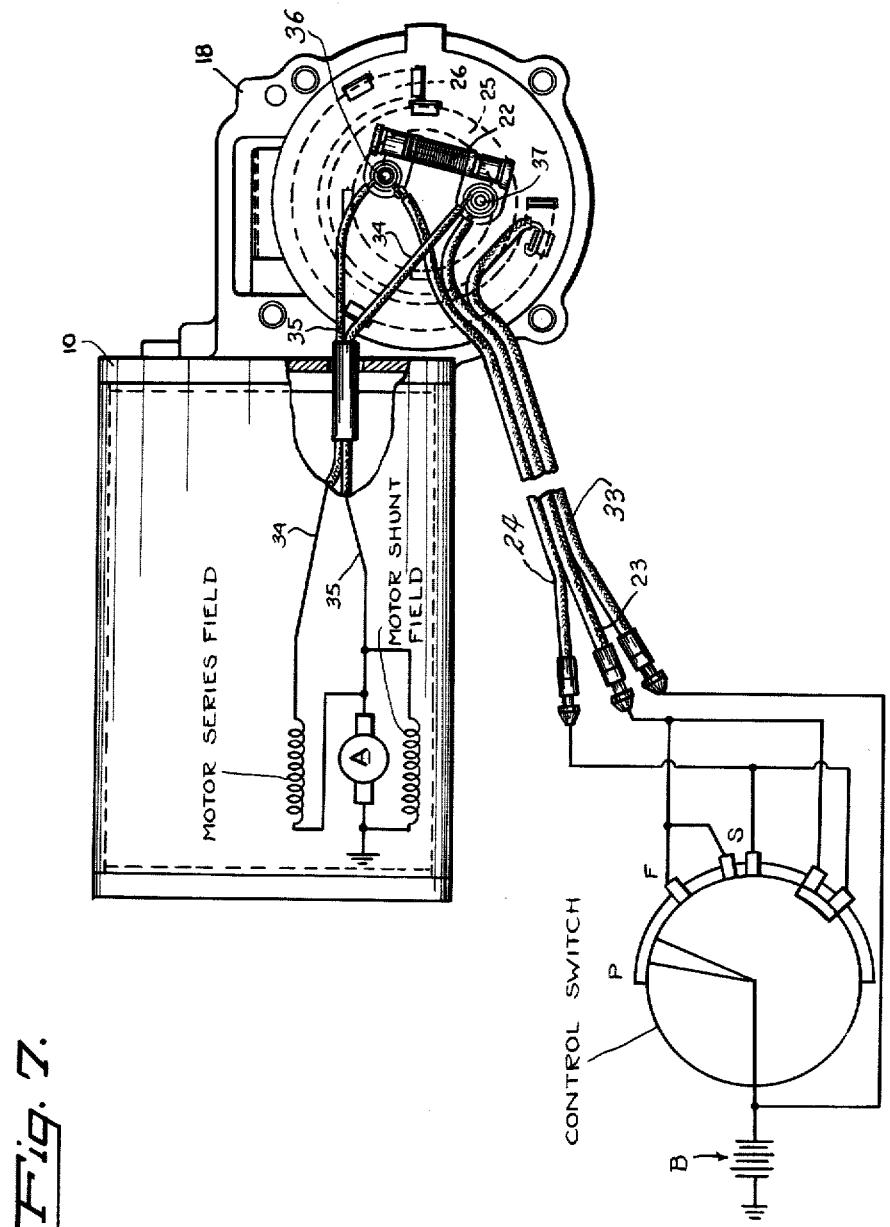

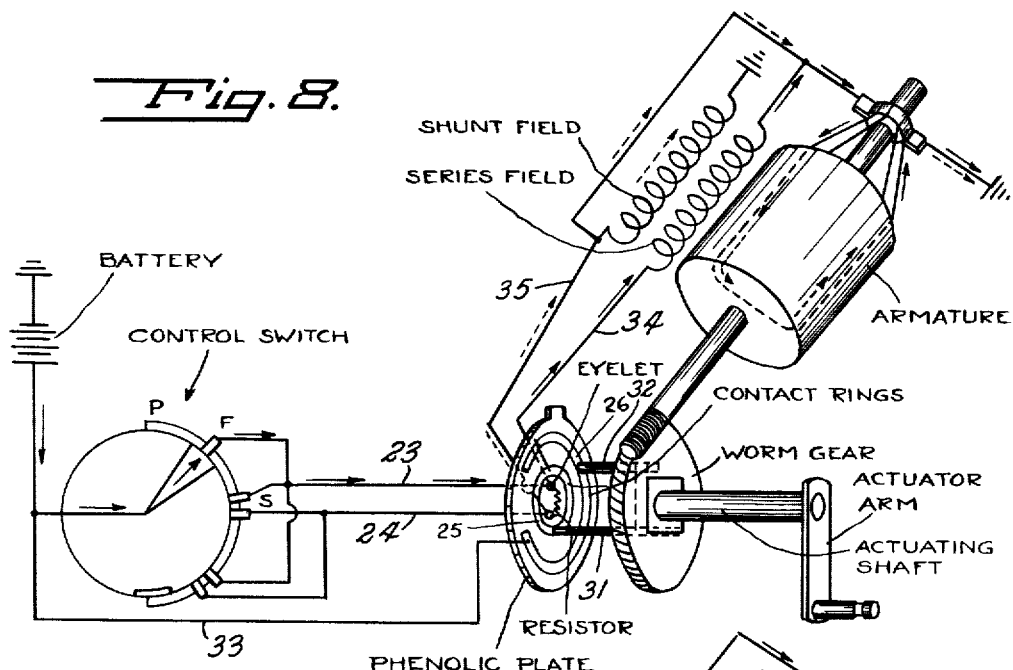
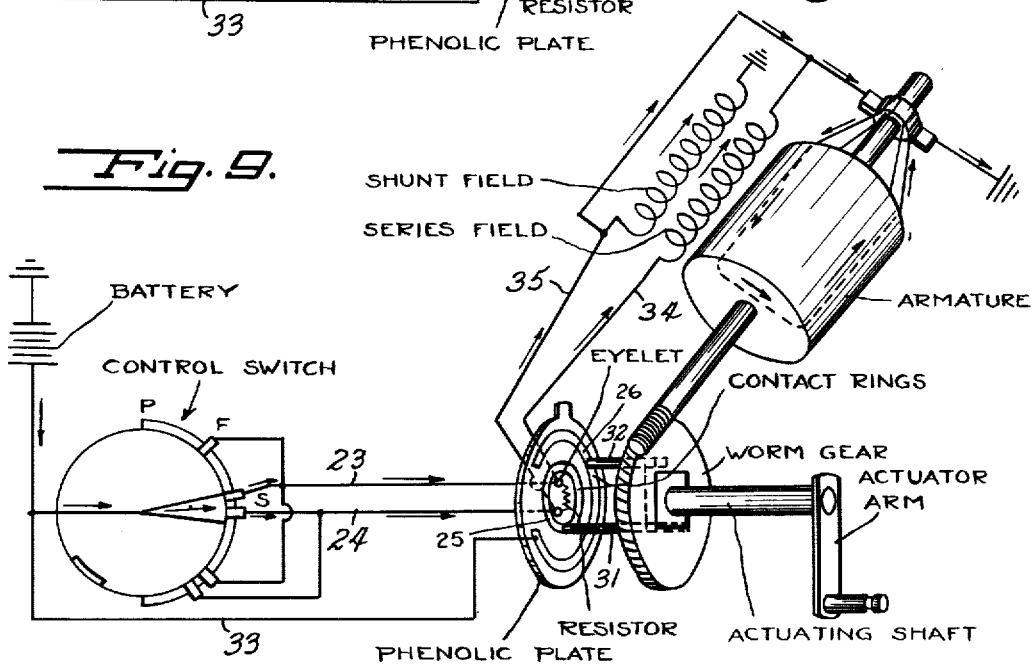

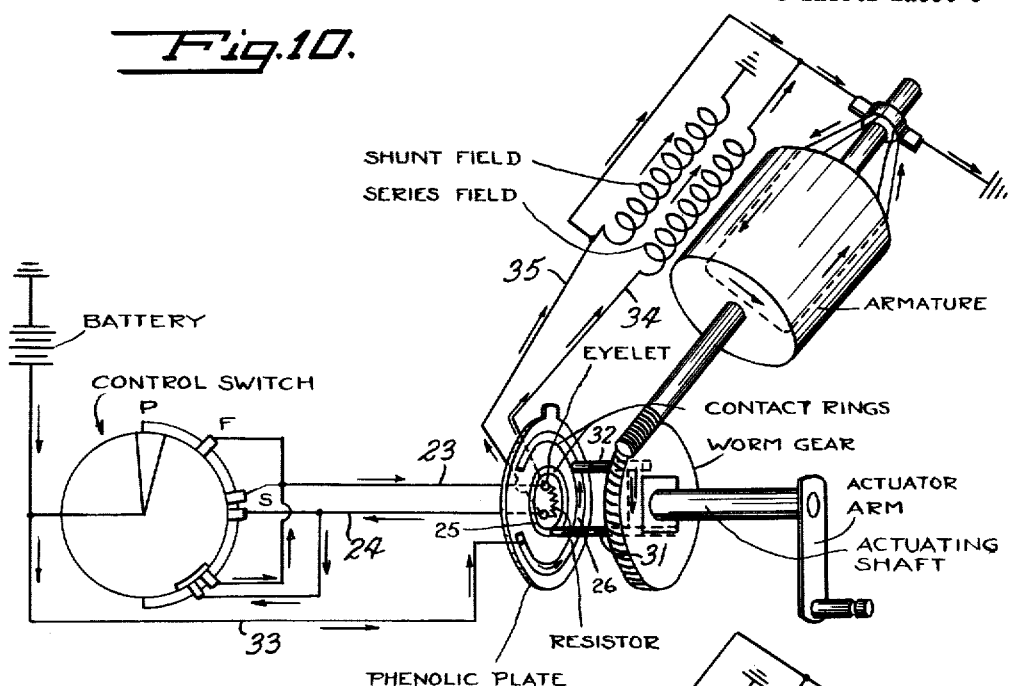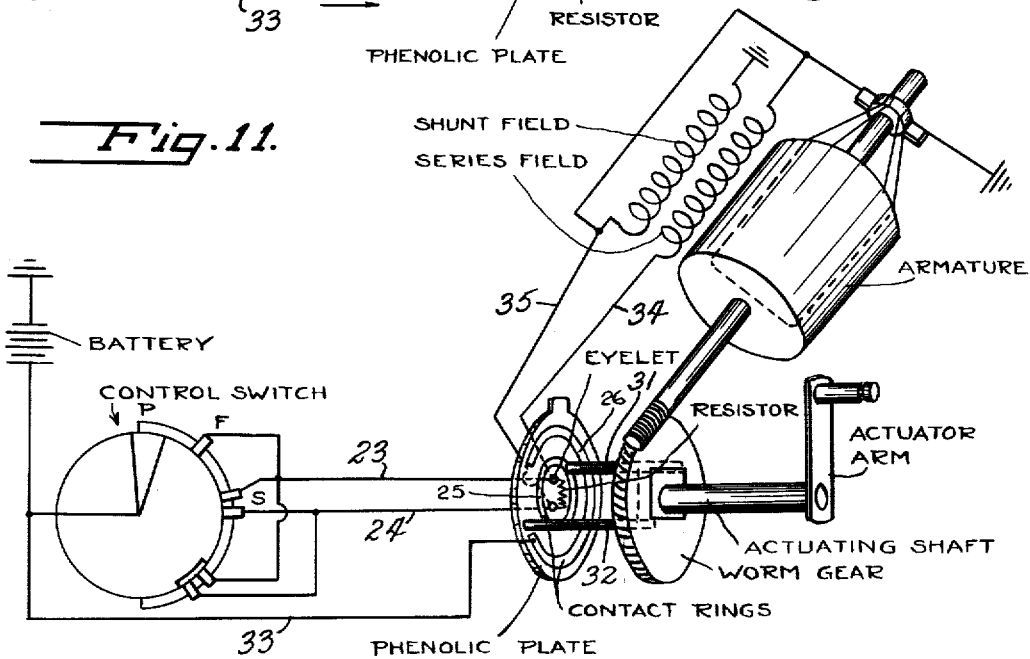

United States Patent Office 3,095,597
Patented July 2, 1963

3,095,597
WINDSHIELD WIPER
Claude F. Waldron, Columbus, Miss., assignor to American Bosch Arma Corporation, a corporation of New York
Filed Mar. 9, 1960, Ser. No. 13,930
10 Claims. (Cl. 15—250.17)

This invention relates to windshield wiping apparatus and has particular reference to a new and improved means for controlling the position of parking of the wiping members thereof.

The object of the invention is to provide a new and improved arrangement for controlling the parking of the wiping members of electrically actuated windshield wiping mechanism when said wiping members are not in use.

Another object is to provide a parking control mechanism for electric windshield wiping apparatus which allows the parking of the wiping members only at the desired location.

Another object is to provide relatively simple, efficient and economical means for controlling the parking of the wiping members of an electrically actuated windshield wiping apparatus.

Other objects and advantages of the invention will be apparent from the following description taken in connection with the accompanying drawings, in which the preferred form has been given by way of illustration only.

Referring to the drawings:

FIG. 7 is a diagrammatic view illustrating the wiring diagram of the wiper circuit; and FIGS. 8 through 11 are schematic views illustrating the wiring circuit during the various phases of operation of the wiper.

Figures 1, 2, 3:
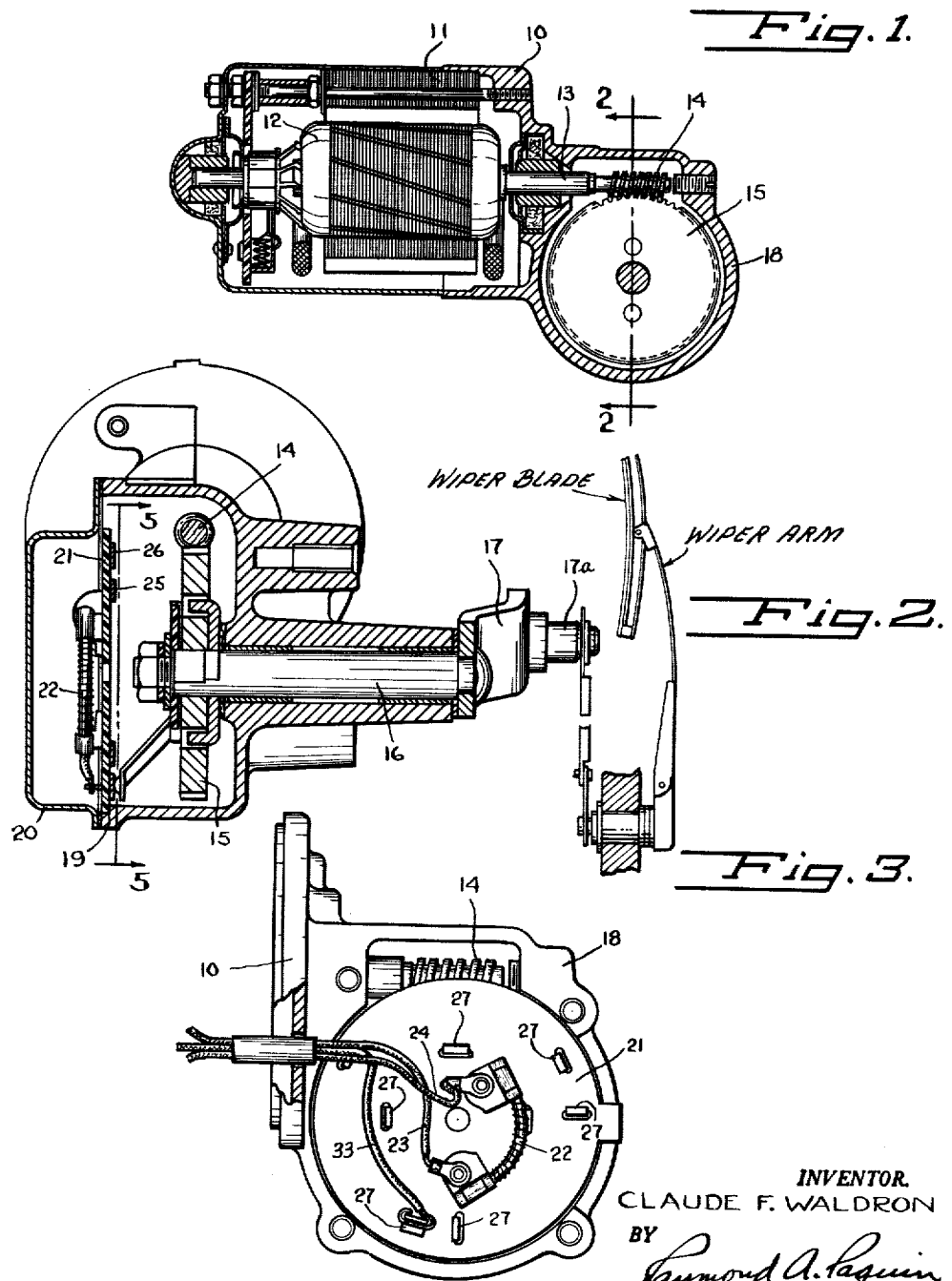
FIG. 1 is a longitudinal sectional view of a windshield wiping apparatus embodying the invention.
FIG. 2 is a sectional view taken on line 2—2 of FIG. 1, looking in the direction of the arrows.
FIG. 3 is a view showing the parking control mechanism with the cover plate removed.
Figure 4:
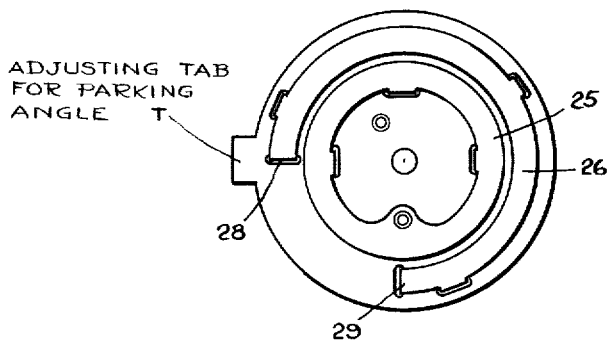
FIG. 4 is a view showing the parking control mechanism of FIG. 3 from the opposite side.
Figure 5:
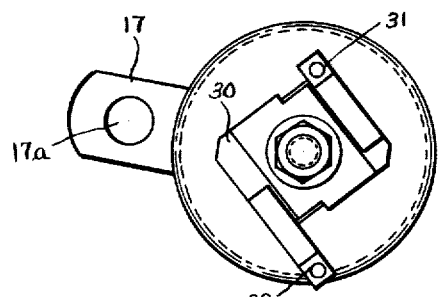
FIG. 5 is a fragmentary sectional view taken on line 5—5 of FIG. 2, looking in the direction of the arrows.

Referring more particularly to the drawings wherein similar reference characters designate corresponding parts throughout, the apparatus shown embodying the invention comprises a motor having the housing 10, stator or pole shoes 11, rotor 12 and the drive shaft 13 having the worm gear 14 thereon meshing with gear 15 on drive shaft 16, on which is positioned the link driving lug 17 having crank pin 17a for connection to the actuating linkage of the wiping mechanism and adapted to oscillate the wiping members upon rotation of gear 15 and shaft 16.

The driving gear 15 is positioned in housing 18 having the shoulder 19, and said housing 18 is adapted to be enclosed by the cover plate 20.

On the shoulder 19 is positioned the switch plate 21, which plate is of insulation or non-conducting material and carries on its outer side the field resistor 22 connected at its opposite ends to leads 23 and 24, hereinafter described.

On the opposite side of plate 21 from resistor 22 are provided the ring contact 25 and the arcuate or ring contact 26. The contacts 25 and 26 are secured on the surface of plate 21 by having lugs 27 extending through openings in said plate 21 and deflected to retain the contacts in position on the plate.

The ring contact 25 is a continuous circular contact, whereas arcuate contact 26 has its ends 28 and 29 in spaced relation with a non-conducting area therebetween.

On the side of gear 15 adjacent plate 21 is provided a conducting member 30, suitably insulated, with said member 30 having the spring contact finger 31 adapted to ride on contact 25 and spring contact finger 32 adapted to ride on arcuate contact 26.

Figure 6:
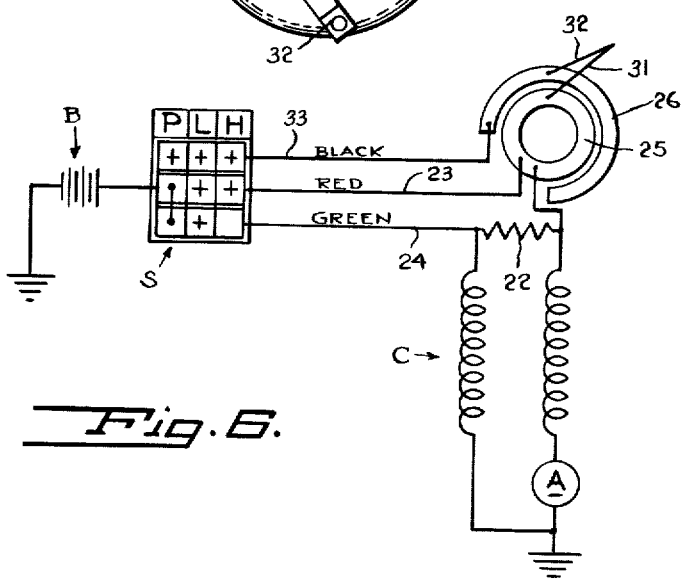
FIG. 6 is a schematic view of the wiring diagram of the wiping apparatus.

As will be seen from FIGS. 3 and 6, leads 23 and 24 connect arcuate contact ring 25 to battery B through switch S, and lead 33 connects arcuate conducting member 26 to battery B through switch S.

The wiper motor is a series-shunt type motor and the shunt coil is used to help maintain a more constant r.p.m. under varying wiper load conditions. The shunt coil C also provides an extra magnetic field to slow down the speed of the motor when the control switch is placed in the low speed position L and also the park position P.

As will be seen from FIG. 6, when the wiper switch is in the high speed position H, a circuit is completed from the battery through the switch, the lead 23, and arcuate ring 25 is energized. As spring contact finger 31 engages said ring 25, the circuit is completed from the battery through the switch and on through the series coil and armature of the motor to ground, and there is some current flowing across the resistor 22 and through the shunt coil C, which helps to maintain a more constant r.p.m. under varying loads of the wiper.

The lead 34 is connected to lead 23 at eyelet 37 and connects lead 23 with the motor series coil and lead 35 is connected to eyelet 35a and connects lead 24 to the motor shunt field.

In FIG. 8, the switch is in fast, F, or high, H, speed position and, as will be seen from the arrows in the drawing, the current flows from the battery through the control switch and lead 23 to the eyelet 37, from which it flows into lead 34 on into the series coil of the motor.

In FIG. 9, the switch is in the slow, S, or low, L, speed position, in which case current flows through lead 23 and lead 24 to eyelets 37 and 35a respectively, from which it flows through leads 34 and 35 to the motor series coil and motor shunt coil respectively, as will be seen from the arrows in the drawing.

In this low speed operation, the series and shunt coils are both energized and the extra strength of the magnetic field produced by the shunt coil C slows down the speed of the motor.

It will be seen that when the wiper control switch S is in the park position P that, since it is desirable to have the wiper park at slow speed, a circuit is completed back through the switch and out to the shunt coil C and, therefore, the motor operates at the low speed until the parking is effected.

In this case the current actually bypasses the control switch and flows out the lead 33 into the outside control ring 26, and current flows in through contact ring 26 to spring contact finger 32 to contact finger 31 to inner contact ring 25. At this point, current can flow directly through lead 34 to the motor series field. Since it is desired to have the wiper park at slow speed, the current also flows out through lead 23 and crosess over to lead 24 and goes back through the eyelet on to the shunt field of the motor. Thus, with both motor series and shunt fields energized, the motor operates at the slow or low speed and continues to turn until the contact finger 32 on the outside contact ring 26 moves into the insulated space between the ends of ring 26 when the wiper coasts to a stop.

It is pointed out that current from the battery can flow through lead 24 and contacts 32 and 31 at any time and is of no consequence, except when the control switch is in parked position and contacts 32 and 31 are still on their respective rings.

The relation of the wiper blade actuator arm to the actuating shaft is such that when the contact 32 is in position to discontinue operation of the motor, that the actuator arm, as shown in FIG. 11, will be in proper angular relation to park the wiper blade in desired position out of the line of vision through the windshield. This is illustrated in FIG. 11 where the apparatus is shown in parked position.

The adjusting tab T is provided for allowing adjustment of the parking angle of the wiper member.

From the foregoing it will be seen that I have provided new and improved means for obtaining all of the objects and advantages of the invention.

I claim:

1. In a device of the character described, an electric motor, a source of power, a wiper member operatively connected to said motor and adapted to be actuated thereby and means for parking said wiper motor in predetermined position, said means comprising a contact ring, a first contact member adapted to contact said ring, an arcuate contact member and a second contact member adapted to contact said arcuate contact member, said first and second contact members being electrically connected, and means for energizing said contact ring through energization of said arcuate contact member, said motor having series field and shunt field windings, and switch means for controlling the energization of said motor, said switch means having high speed, low speed and park settings, said switch means being connected to said motor whereby when said switch means is on its park setting that said shunt and field windings will be energized and said contact finger will move until it reaches the end of said arcuate contact.

2. In a device of the character described, an electric motor, a source of power, a wiper member operatively connected to said motor and adapted to be actuated thereby and means for parking said wiper motor in predetermined position, said means comprising a contact ring, a first contact member adapted to contact said ring, an arcuate contact member and a second contact member adapted to contact said arcuate contact member, said first and second contact members being electrically connected, and means for energizing said contact ring through said arcuate contact member, said arcuate contact member having a non-conducting portion between its adjacent ends, said motor having series field and shunt field windings, and switch means for controlling the energization of said motor, said switch means having high speed, low speed and park settings, said switch means being connected to said motor whereby when said switch means is on its park setting that said shunt and field windings will be energized and said contact finger will move until it reaches the end of said arcuate contact.

3. In a device of the character described, an electric motor, a source of power, a wiper member operatively connected to said motor and adapted to be actuated thereby and means for parking said wiper motor in predetermined position, said means comprising a plate having a contact ring, a first contact member adapted to contact said ring, an arcuate contact member and a second contact member adapted to contact said arcuate contact member, said first and second contact members being electrically connected, and means for energizing said contact ring through said arcuate contact member, said arcuate contact member having a non-conducting portion between the ends of said arcuate contact member and means for pivoting said plate to thereby change the parking angle of said wiper member, said motor having series field and shunt field windings, and switch means for controlling the energization of said motor, said switch means having high speed, low speed and park settings, said switch means being connected to said motor whereby when said switch means is on its park setting that said shunt and field windings will be energized and said contact finger will move until it reaches the end of said arcuate contact.

In a device of the character described, an electric motor, a source of power, a wiper member operatively connected to said motor and adapted to be actuated thereby and means for parking said wiper motor in predetermined position, said means comprising a contact ring, a first contact member adapted to contact said ring, an arcuate contact member and a second contact member adapted to contact said arcuate contact member, said first and second contact members being electrically connected, and means for energizing said arcuate contact ring through said arcuate contact member, said arcuate contact ring and arcuate contact member being mounted on a non-conducting plate, said motor having series field and shunt field windings, and switch means for controlling the energization of said motor, said switch means having high speed, low speed and park settings, said switch means being connected to said motor whereby when said switch means is on its park setting that said shunt and field windings will be energized and said contact finger will move until it reaches the end of said arcuate contact.

5. In a device of the character described, an electric motor, a source of power, a wiper member operatively connected to said motor and adapted to be actuated thereby and means for parking said wiper motor in predetermined position, said means comprising a contact ring, a first contact member adapted to contact said ring, an arcuate contact member and a second contact member adapted to contact said arcuate contact member, said first and second contact members being electrically connected, and means for energizing said arcuate contact ring through said arcuate contact member, said contact ring and arcuate contact member being mounted on a non-conducting plate and having tab portions extending through openings in said plate and deflected to maintain said ring and member in operative position on said plate, said motor having series field and shunt field windings, and switch means for controlling the energization of said motor, said switch means having high speed, low speed and park settings, said switch means being connected to said motor whereby when said switch means is on its park setting that said shunt and field windings will be energized and said contact finger will move until it reaches the end of said arcuate contact.

6. In a device of the character described, an electric motor, a source of power, a wiper member operatively connected to said motor and adapted to be actuated thereby and means for parking said wiper motor in predetermined position, said means comprising a contact ring, a first contact member adapted to contact said ring, an arcuate contact member and a second contact member adapted to contact said arcuate contact member, said first and second contact members being electrically connected, and means for energizing said contact ring through said arcuate contact member, said contact ring and said arcuate contact member being in concentric relation, said motor having series field and shunt field windings, and switch means for controlling the energization of said motor, said switch means having high speed, low speed and park settings, said switch means being connected to said motor whereby when said switch means is on its park setting that said shunt and field windings will be energized and said contact finger will move until it reaches the end of said arcuate contact.

7. In a device of the character described, an electric motor, a source of power, a wiper member operatively connected to said motor and adapted to be actuated thereby and means for parking said wiper motor in predetermined position, said means comprising a contact ring, a first contact member adapted to contact said ring, an arcuate contact member and a second contact member adapted to contact said arcuate contact member, said first and second contact members being electrically connected, and means for energizing said contact ring through said first and second contact members, said arcuate contact member having a non-conducting portion, said contact ring and said arcuate contact member being in concentric relation, said motor having series field and shunt field windings, and switch means for controlling the energization of said motor, said switch means having high speed, low speed and park settings, said switch means being connected to said motor whereby when said switch means is on its park setting that said shunt and field windings will be energized and said contact finger will move until it reaches the end of said arcuate contact.

8. In a device of the character described, an electric motor, a source of power, a wiper member operatively connected to said motor and adapted to be actuated thereby and means for parking said wiper motor in predetermined position, said means comprising a contact ring, a first contact member adapted to contact said ring, an arcuate contact member and a second contact member adapted to contact said arcuate contact member, said first and second contact members being electrically connected, and means for selectively energizing said arcuate contact ring through said arcuate contact member and said first and second contact members, said arcuate contact member having a non-conducting portion between the ends of said arcuate contact member, said contact ring and said arcuate contact member being in concentric relation, said motor having series field and shunt field windings, and switch means for controlling the energization of said motor, said switch means having high speed, low speed and park settings, said switch means being connected to said motor whereby when said switch means is on its park setting that said shunt and field windings will be energized and said contact finger will move until it reaches the end of said arcuate contact.

9. In a device of the character described, an electric motor, a source of power, a wiper member operatively connected to said motor and adapted to be actuated thereby and means for parking said wiper motor in predetermined position, said means comprising a contact ring, a first contact member adapted to contact said ring, an arcuate contact member and a second contact member adapted to contact said arcuate contact member, said first and second contact members being electrically connected, and means for energizing said arcuate contact ring through said arcuate contact member and said first and second contact members, said arcuate contact ring and arcuate contact member being mounted on a non-conducting plate, said contact ring and said arcuate contact member being in concentric relation, said motor having series field and shunt field windings, and switch means for controlling the energization of said motor, said switch means having high speed, low speed and park settings, said switch means being connected to said motor whereby when said switch means is on its park setting that said shunt and field windings will be energized and said contact finger will move until it reaches the end of said arcuate contact.

10. In a device of the character described, an electric motor, a source of power, a wiper member operatively connected to said motor and adapted to be actuated thereby and means for parking said wiper motor in predetermined position, said means comprising a contact ring, a first contact member adapted to contact said ring, an arcuate contact member and a second contact member adapted to contact said arcuate contact member, said first and second contact members being electrically connected, and means for energizing said arcuate contact ring through said arcuate contact member, said arcuate contact ring and arcuate contact member being mounted on a non-conducting plate and having tab portions extending through openings in said plate and deflected to maintain said ring and member in operative position on said plate, said contact ring and said arcuate contact member being in concentric relation, said motor having series field and shunt field windings, and switch means for controlling the energization of said motor, said switch means having high speed, low speed and park settings, said switch means being connected to said motor whereby when said switch means is on its park setting that said shunt and field windings will be energized and said contact finger will move until it reaches the end of said arcuate contact.

References Cited in the file of this patent

UNITED STATES PATENTS

| 873,737 | Eastwood | Dec. 17, 1907 |
| 2,205,482 | Krieder | June 25, 1940 |
| 2,855,784 | Dyer | Oct. 14, 1958 |

FOREIGN PATENTS

| 210,317 | Australia | Sept. 19, 1957 |
| 828,994 | France | Mar. 7, 1938 |

UNITED STATES PATENT OFFICE
CERTIFICATE OF CORRECTION

Patent No. 3,095,597                               July 2, 1963

Claude F. Waldron

It is hereby certified that error appears in the above numbered patent requiring correction and that the said Letters Patent should read as corrected below.

In the drawings, Figs. 7, 8, 9, 10 and 11, delete the line schematically representing a conductor or electrical connection directly connecting one end of one field winding to one end of the other field winding.; column 2, lines 29 and 38, for "35a", each occurrence, read -- 36 --; line 59, for "crosess" read -- crosses --; column 3, line 75, before "In" insert -- 4. --.

Signed and sealed this 25th day of February 1964.

(SEAL)
Attest:

ERNEST W. SWIDER

Attesting Officer

EDWIN L. REYNOLDS
                                       Acting Commissioner of Patents